No. 791,989. Patented June 6, 1905.

UNITED STATES PATENT OFFICE.

TILLMAN RAMS, OF KANSAS CITY, MISSOURI.

COMPOUND FOR PRESERVING EGGS.

SPECIFICATION forming part of Letters Patent No. 791,989, dated June 6, 1905.

Application filed May 13, 1904. Serial No. 207,872.

*To all whom it may concern:*

Be it known that I, TILLMAN RAMS, a citizen of the United States, residing at Kansas City, in the county of Jackson and State of Missouri, have invented a new and useful Composition of Matter to be Used for the Preserving and Storing of Eggs at a Nominal Expense, of which the following is a specification.

My invention relates to preservative compounds particularly designed for preserving eggs; and it includes substantially the ingredients combined in substantially the proportions to be hereinafter described, and pointed out in the claims.

The preservative preferably consists of a mixture of purified clay, Baker's ammonia or carbonate of ammonia, and sweetwood, with which powdered charcoal may be mixed.

In the manufacture of the composition the clay, which is intended as a cooling medium, is thoroughly dehydrated and pulverized. It is important that substantially all the moisture be removed from the clay, or otherwise it would tend to mold the eggs or aid in the decaying of the same. The clay may be dehydrated by subjecting it to hot air or heat in any suitable manner.

Baker's ammonia, which is utilized primarily on account of its cooling qualities, is also thoroughly pulverized and is intermixed with the clay in the proportions of substantially one hundred parts to ten parts of Baker's ammonia.

The sweetwood or licorice-root is intended primarily as a sweetening medium, and it has the quality of not absorbing moisture, as would be the case with sugar or like sweetening substances. About five parts of sweetwood are mixed with the proportions of the other two ingredients heretofore stated.

If charcoal is used in the mixture, about ten parts of the same are added to the proportions of the other ingredients stated, and it acts, as is well known, as a purifier.

As will be appreciated, in the preservative thus formed the dried clay and pulverized ammonia will act as cooling agents, while the licorice-root or sweetwood will impart a slight degree of sweetness to the other ingredients, and thus aid in keeping the eggs sweet.

I claim—

1. A preservative compound, consisting of clay, licorice and carbonate of ammonia.

2. A preservative compound, consisting of clay, licorice and Baker's ammonia combined in about the proportions of one hundred parts clay, five parts licorice, and ten parts Baker's ammonia.

3. A preservative compound, consisting of dehydrated pulverized clay, pulverized Baker's ammonia, and licorice.

4. A preservative compound, consisting of substantially one hundred parts dehydrated pulverized clay, substantially ten parts of carbonate of ammonia, substantially five parts licorice and substantially ten parts of charcoal, substantially as described.

In testimony whereof I have signed my name to this specification, in presence of two subscribing witnesses, at Kansas City, in the county of Jackson and State of Missouri, this 3d day of May, 1904.

TILLMAN RAMS.

Witnesses:
ROSAMOND YOUNG,
C. W. ALDRICH.